Aug. 25, 1970     H. G. ABBEY     3,525,922
CURRENT-BALANCING SYSTEMS FOR PARALLEL DIODES
Filed Dec. 23, 1968     2 Sheets-Sheet 1

INVENTOR.
HAROLD G. ABBEY
BY
ATTORNEY

United States Patent Office 3,525,922
Patented Aug. 25, 1970

3,525,922
CURRENT-BALANCING SYSTEMS FOR PARALLEL DIODES
Harold G. Abbey, Detroit, Mich.
(130 Sunrise Ave., Palm Beach, Fla. 33480)
Filed Dec. 23, 1968, Ser. No. 786,147
Int. Cl. H02m 7/00
U.S. Cl. 321—27                                 6 Claims

ABSTRACT OF THE DISCLOSURE

A current-balancing system for a rectifying circuit wherein alternating-current is supplied to two sets of parallel diodes, the diodes in one set effecting rectification in one current direction, and those in the other set effecting rectification in the reverse direction. Also provided is a series of reactors having at least one primary and two secondaries associated with a ring core of high permeability. The diodes in each set are connected to the respective primaries of the reactors, whereby in the course of an A-C cycle, magnetic flux generated by direct-current flow in one set is in a direction opposed to that generated by direct-current flow in the other set, thereby reversing the flux direction in each core and effectively eliminating residual magnetism therein. The secondaries of the reactors are interconnected in phase opposition in a closed inductive magnetic circuit, such that inequalities in the EMF's generated in the cores by reason of unequal current flow through the diodes, produce counter EMF's and impedance changes in the reactors tending to equalize the diode current flows.

---

Figure 1:
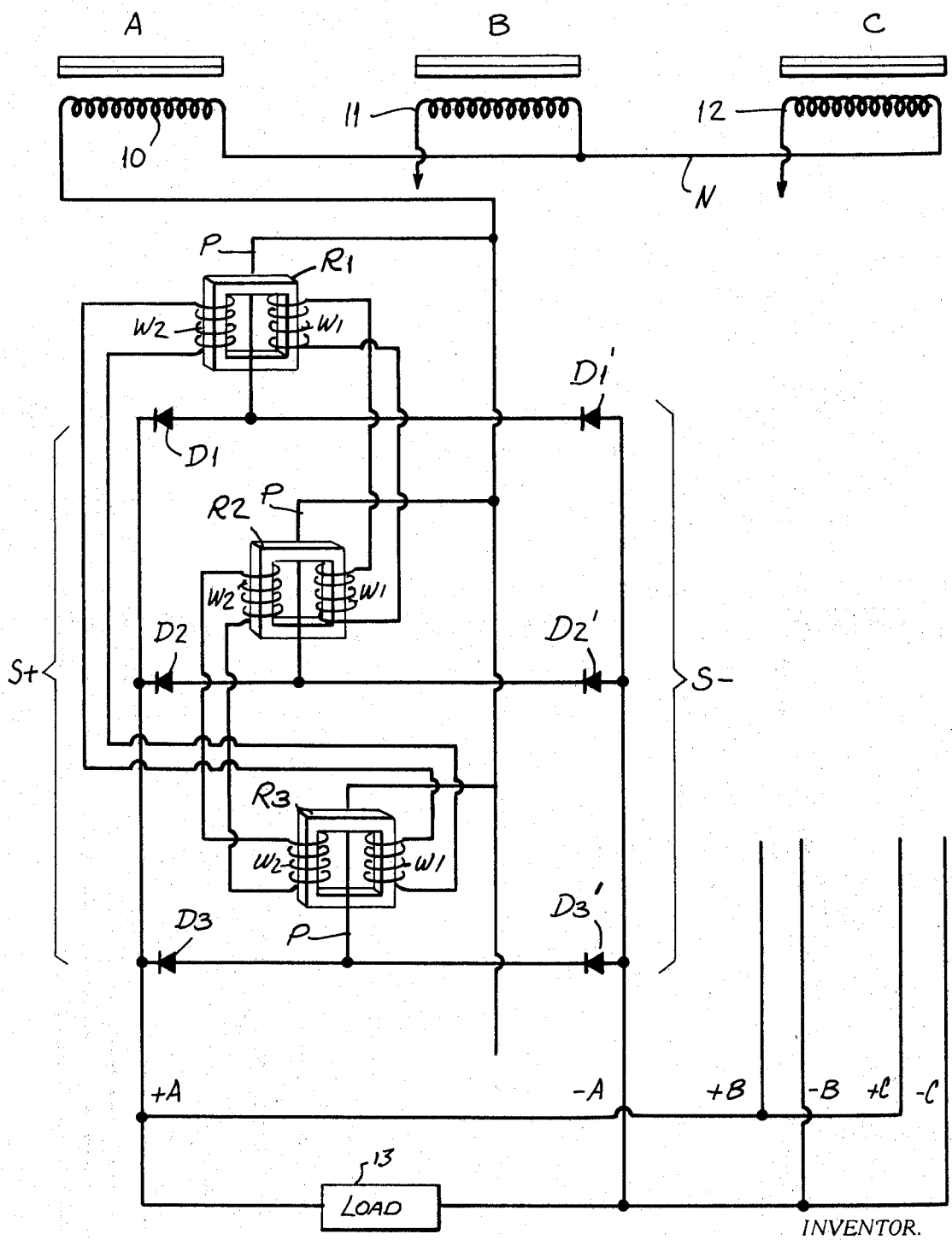

This invention relates generally to parallel-connected diode rectification circuits, and more particularly to a current-balancing reactor arrangement to equalize current flow through the diodes despite differences in the individual characteristics thereof.

In recent years, semiconductive power rectifiers or diodes of the copper-oxide, germanium, selenium and silicon types, have played increasingly important roles in many industrial applications involving electrical and electronic equipment. While the phenomenon of asymmetric conduction, upon which all such rectifiers are based, has been studied for over a century, the practical development of commercial rectifiers is a fairly recent development. The principal electrical characteristics of a power diode are forward and inverse current, voltage and resistance, internal capacitance, power dissipation and rectification efficiency.

In order to obtain exceptionally high current capacities in the order, for instance, of 1000 to 5000 amperes in multiphase and other rectifying systems, it is the usual practice to connect a plurality of diodes in shunt or parallel relation. Since individual diodes vary in their forward voltage characteristics, the current distribution among parallel-connected diodes will be unequal unless the diodes are closely matched in their characteristics. As a practical matter, this is difficult and expensive to do, for it requires careful testing of the diodes before installation. Moreover, diode characteristics tend to creep with age and to change with temperature and many other variables. Hence even if initially matched, an imbalance in forward current flow in the parallel-connected diodes will arise after a short period of operation.

In the patent to Dortort, 2,994,028, there is disclosed a balancing reactor arrangement whereby the forward voltage drop of any individual diode is automatically adjusted by inductive means to bring about a substantially equal current distribution among a plurality of parallel-connected diodes, even though the forward conduction characteristics are unmatched.

In one embodiment of the Dortort invention, there is provided a reactor system comprising a through-type balancing reactor in a so-called "white tree" arrangement wherein a main current-carrying bus is divided into two branches. Each of these branches is then connected to form a first and second winding of a magnetic core, whereby the fluxes induced in the magnetic core due to the first and second winding are in opposing directions.

Thus, if current through the first branch exceeds current in the second branch by the magnetizing current of the reactor, the voltage of the first branch will be reduced, and the voltage in the second branch increased by an equal amount and to a degree sufficient to increase and decrease their currents respectively, so that they will differ by no more than the required magnetizing current. In a similar manner, if current in the second branch exceeds current in the first branch by the magnetizing current of the reactor, the voltage of the first branch will be increased and the voltage of the second branch decreased.

It is to be noted that the flux of the reactor during any conductive cycle is varied only in a single direction, this flux being diminished to its residual flux density during the blocking cycle of the respective series-connected diode. For this reason, the reactor cores in Dortort are of the type having a low residual magnetization.

With the Dortort system, it is desirable to utilize a reactor having a low residual magnetization, for the flux-reversing operation of the reactor will occur somewhere between its point of residual flux density and saturation flux density. Thus, by providing a low residual magnetization for a low residual flux density, the core will be able to achieve a relatively large flux change and may be made relatively small as compared to cores having a relatively high residual magnetization.

Nevertheless, it is advantageous to utilize a core material of the grain-oriented type, since magnetizing currents in these cores are extremely low. The use of such cores presents a problem, for their residual magnetization is extremely high as compared to cores constructed of normal transformer steel and having air gaps therein.

Dortort indicates that he can make use of a core material of the grain-oriented type, by providing an air gap or by incorporating a control circuit for reducing the residual flux of the control cores to zero during the blocking period of the diode associated with the reactor. This control circuit includes an auxiliary coil for the reactor which is connected in series with a capacitor to form a resonant circuit whose operation is initiated during inverse voltage conditions so as to oscillate at a frequency which is relatively high when compared to the frequency of the A-C source being rectified. The oscillating current of this resonant circuit is supplied to the core so that a gradually diminishing magnetomotive force is applied thereto during inverse voltage conditions of the diode in order to return the core to a zero or very low residual flux.

Thus Dortort, by reason of his arrangement, is faced with a basic contradiction. On one hand, he recognizes the desirability of using highly permeable material such as grain-oriented steel to achieve maximum flux change. At the same time, he calls for low residual magnetization between forward current surges. However, these requirements are incompatible, for grain-oriented material has higher residual magnetism than less permeable material. In order, therefore, to use highly permeable material, Dortort resorts either to an air gap or external windings in an oscillation circuit to lower the residual flux density, both of which have distinct disadvantages.

In view of the foregoing, it is the primary object of the present invention to provide a reactor system for equally distributing current among parallel-connected diodes of disparate characteristics, which system makes use of reactor cores of the most highly permeable material available for optimum transforming efficiency, without the need for air gaps or other expedients to reduce residual magnetism.

More specifically, it is an object of this invention to provide a reactor system for balancing parallel-connected diodes, wherein the reactor cores are subjected to periodically reversing electromagnetic fields to eliminate residual magnetism.

Briefly stated, in one embodiment of a current-balancing reactor system in accordance with the invention, the output of an A-C source is full-wave rectified by two like sets of parallel diodes, the diodes in one set effecting rectification in one current direction, and those in the other set effecting rectification in the reverse direction. Also provided is a series of reactors equal in number to the number of diodes in a set, each reactor having at least one primary and two secondaries associated with a ring core of high permeability. The diodes in each parallel set thereof are connected, respectively, to the primaries of the reactors in the series, whereby in the course of an operating cycle, the magnetic flux generated by direct current flow in one set, is in a direction opposed to that generated by D-C current flow in the other set, thereby reversing the flux direction in each core and effectively eliminating residual magnetism.

One secondary in the first reactor is connected in phase opposition to one secondary of the second reactor in the series thereof, and the other secondary of the second reactor is connected in phase opposition to the other secondary of the third reactor, and so on, the one secondary in the last reactor in the series being connected in phase opposition to the other secondary of the first reactor to create a closed inductive magnetic circuit.

In operation, each reactor secondary generates an EMF in proportion to the flux density in the associated core, and since the secondaries are close-circuited and in phase opposition, if the EMF developed in one reactor is unequal to that developed in the next reactor in the series, by reason of disparate current flows in the associated diodes, then a current will flow in such direction as to increase the counter EMF or impedance of the reactor serving the diode carrying the lesser current to bring about a balance between the two currents.

In another embodiment of the invention, the secondary coils are dispensed with, and in lieu thereof, the diode in each set is connected in series with both a primary of one reactor and a primary of the next reactor in the series, the two primaries being in bucking relationship to effect the desired current-balancing action.

Figure 2:
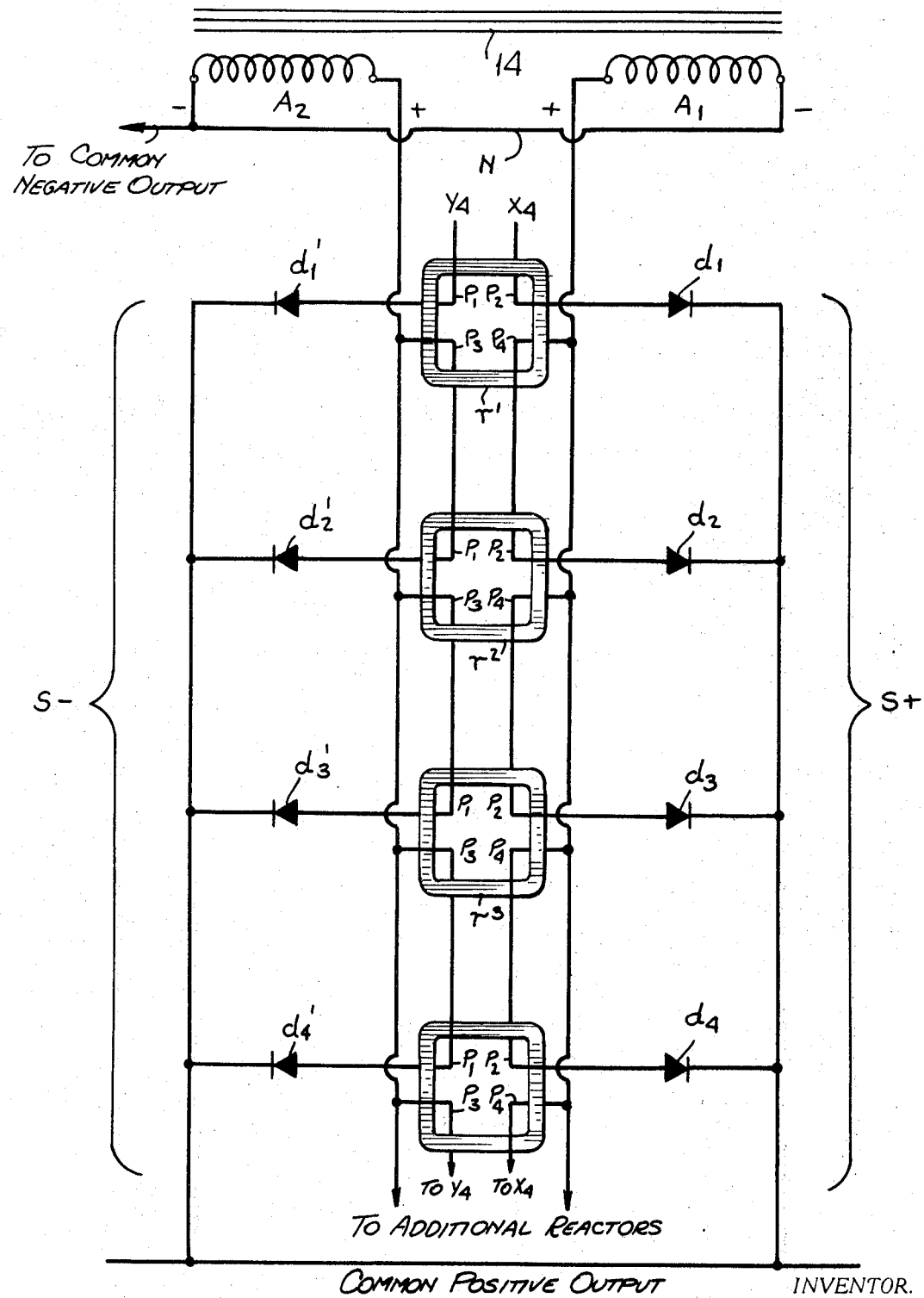

For a better understanding of the invention, as well as other objects and further features thereof, reference is made to the following detailed description to be read in conjunction with the accompanying drawings, wherein:

FIG. 1 is a schematic circuit diagram of one embodiment of a current-balancing system in accordance with the invention; and FIG. 2 is a schematic circuit diagram of another embodiment thereof.

Referring now to FIG. 1, the invention will be illustrated in connection with a three-phase, full-wave circuit arrangement, only one phase of which is shown in detail. It is to be understood, however, that the principles underlying the invention are applicable to all forms of full-wave power rectifiers using sets of parallel diodes and including transformerless as well as transformer-type power supplies.

The invention has particular application to electroplating and other electrochemical processes which require high currents (up to several thousand amperes), at high as well as low voltages. The higher the D-C voltage, the more critical the need for balancing, for a current mismatch at high voltages gives rise to serious changes in current output. At low voltages one may overrate the diodes and balancing becomes less important. For efficiency and simplicity, selenium or silicon diodes, operated from three-phase A-C power, are used extensively, with sets of parallel-connected diodes providing the desired high-current capability.

In FIG. 1, the three-phase transformer for phases A, B and C of the three-phase supply, includes a secondary winding 10 for phase A, a secondary winding 11 for phase B, and a secondary winding 12 for phase C. One end of each winding is connected to a common neutral line N. Only the rectifier and balancing circuit for phase A is shown, in that the circuits for phases B and C are identical.

Full-wave rectification is obtained by means of two sets of parallel-connected diodes. The first set S+, composed of three diodes D1, D2 and D3, is connected to the secondary winding 10 to effect rectification during the positive half-cycles of the A-C wave, the resultant direct voltage being applied to load 13. The second set S—, composed of three diodes D1', D2' and D3', is connected to the secondary winding 10 to effect rectification during the negative half-cycles of the A-C wave.

While each set is shown as being made up of three parallel-connected diodes, this is only by way of example, and in practice a larger number may be used, depending on the current requirements of the system.

Also provided is a series of reactors R1, R2 and R3, equal in number to the number of diodes in each set. Each reactor includes a ring core, a primary conductor P, and two secondary windings W1 and W2. The ring core may be circular or square, the latter being shown, and is a laminated structure formed of high-permeability material such as grain-oriented steel or silicon steeel.

Corresponding diodes D1 and D1' in the two sets S+ and S—, are connected in opposing polarity to secondary winding 10 of the three-phase transformer through the primary conductor P of reactor R1. In like manner, corresponding diodes D2 and D2' are connected to secondary winding 10 through primary conductor P of reactor R2, while corresponding diodes D3 and D3' are connected through primary P of reactor R3.

Thus when the diodes in set S+ are conductive during the positive half-cycles of the A-C supply, current flow through the primaries P in reactors R1, R2 and R3, is in one direction, and when the diodes in set S— are conductive during the negative half-cycles, current flow through the primaries P is in the reverse direction.

In the ferromagnetic core, current flow in the primary produces a magnetomotive force which effects magnetization of the core. Upon removal of the magnetizing force, the orientations of the domains resulting from the applied field tend to persist to a greater or lesser extent, depending upon their distribution in space, which in turn depends on the internal structure of the material. This residual magnetism can be removed by the application of a reverse or demagnetizing force.

Thus residual magnetism which remains in the core after current flow ceases in the diode set S+, is virtually eliminated by demagnetization effected by current flow in the reverse direction when the diodes in set S— are operative.

The secondaries of the reactors R1, R2 and R3 are connected in a closed, inductive magnetic circuit. Thus secondary W1 of reactor R1 is connected in phase-opposition or in bucking relationship to secondary W1 of reactor R2, whereas the other secondary W2 of reactor R2 is connected in phase-opposition to secondary W2 of reactor R3, whose secondary W1 is connected to secondary W2 of reactor R1, thereby closing the inductive loop.

In operation, each secondary winding generates an EMF proportional to the flux density in its associated core. Since secondary winding W1 in reactor R1 produces an EMF which bucks that produced by secondary winding W1 in reactor R2, if the EMF's are equal, they will cancel out. However, if the EMF's are unequal due to differences in current flow through the related primaries P, current will flow in such a direction as to increase the counter-EMF or impedance of the core serving the primary P carrying the lesser current, thereby bringing about a balance between the two currents. Similarly, the reactor R2 serves to balance reactor R3, and reactor R3 balances reactor R1.

Thus it becomes possible to use reactors having high-permeability cores to provide an economical, current-balancing system of high efficiency with minimum losses.

In the second embodiment shown in FIG. 2, one may dispense entirely with the secondary windings to effect current balancing and instead make use of primary conductors which are arranged on the cores in bucking relationship to produce the desired action. It is to be understood, however, that in the network shown in FIG. 2, one may supplement the primary conductor set-up with secondary coils, in which event the secondaries are connected in a closed inductive-magnetic loop in the same manner shown in FIG. 4.

In the reactor balancing network shown in FIG. 2, only phase A of a three-phase transformer 14 is shown, this phase being split by a pair of secondary windings into phase $A_1$ and $A_2$. Corresponding ends of windings $A_1$ and $A_2$ are connected to the neutral line N so that the A-C waves produced by these windings are in alternative phase in the same direction of current flow.

Associated with winding $A_1$ is a set S+ of four rectifying diodes $d_1$, $d_2$, $d_3$ and $d_4$, connected in parallel relation to increase the current capability of the system. Similarly associated with winding $A_2$ is a set S— of four rectifying diodes $d_1'$, $d_2'$, $d_3'$ and $d_4'$. A series of four reactors $r_1$, $r_2$, $r_3$ and $r_4$ is provided.

Obviously, the number of diodes and associated reactors may, in practice, be greater. Each reactor is provided with a ring core of exceptionally high permeability and four primary conductors $P_1$, $P_2$, $P_3$ and $P_4$. Primaries $P_1$ and $P_4$ are wound in one direction with respect to the associated core and primaries $P_2$ and $P_3$ in the opposing direction, as indicated by the ⊗ and ⊙ symbols in the figure.

In set S+, diode $d_1$ is connected in series both with primary $P_2$ of its associated reactor $r_1$ and primary $P_4$ of reactor $r_4$, which primaries are in phase-opposition to each other. In a similar fashion, diode $d_2$ is connected in series both with primary $P_2$ of reactor $r_2$ and $P_4$ of reactor $r_1$, diode $d_3$ is connected in series both with primary $P_2$ of reactor $r_3$ and primary $P_4$ of reactor $r_3$, and diode $d_4$ is connected in series both with primary $P_2$ of reactor $r_4$ and primary $P_4$ of reactor $r_3$. Thus the primaries of the reactors are arranged in a closed inductive-magnetic loop.

The arrangement of diodes $d_1'$, $d_2'$, $d_3'$ and $d_4'$ in set S— with respect to the oppositely wound primaries $P_1$ and $P_3$ of the four reactors corresponds to that in set S+ with regard to primaries $P_2$ and $P_4$ and is also in a closed inductive-magnetic loop.

Thus in operation, as to reactor $r_1$, opposing primaries $P_2$ and $P_4$ associated with diodes $d_1$ and $d_2$ generate an EMF proportional to the flux density in the associated core, which EMF's buck and cancel when current through these diodes is equal. But if the EMF's are unequal due to differences in current flow-through diodes $d_1$ and $d_2$, current will flow in such a direction as to increase the counter-EMF or impedance of the core serving the primary carrying the lesser current, thereby bringing about a balance between the two currents. Balancing is effected in like manner in regard to the other diodes in set S+ and in set S—.

Inasmuch as the magnetic effect produced by primary $P_1$ is opposed to that produced by primary $P_2$, this being true also of the effect produced by primaries $P_3$ and $P_4$, residual magnetism in the cores is eliminated.

While there have been shown and described preferred embodiments of current-balancing systems for parallel diodes, in accordance with the invention, it will be appreciated that many changes and modifications may be made therein without, however, departing from the essential spirit of the invention as defined in the annexed claims.

What I claim is:

1. A full-wave rectifying system for deriving a direct voltage from an A-C supply, said system comprising:
   (a) two like sets of diodes connected in parallel relation, said sets being coupled to said A-C supply in an arrangement wherein the diodes in one set effect rectification in one current direction and those in the other set effect rectification in the reverse current direction,
   (b) a series of reactors equal in number to the number of diodes in each set, each reactor having a core and at least one primary,
   (c) means connecting the reactors in a closed inductive-magnetic loop wherein the last reactor of the series is coupled to the first reactor thereof, each reactor being connected in bucking relationship to the next reactor,
   (d) means connecting the diodes in one of said sets in series with respective primaries of said reactors whereby a magnetic flux is generated in one direction in the associated cores when current flows through said diodes, and
   (e) means connecting the diodes in the other of said sets in series with respective primaries of said reactors whereby a magnetic flux is generated in the reverse direction in the associated cores when current flows through said diodes, thereby substantially eliminating residual magnetism in said cores.

2. A system as set forth in claim 1, wherein said reactors are each provided with two secondaries, and wherein in said closed loop each secondary in one reactor is connected in bucking relationship to a secondary in the next reactor in the series.

3. A system as set forth in claim 1, wherein said cores are closed rings.

4. A system as set forth in claim 2, wherein said cores are formed of grain-oriented steel.

5. A system as set forth in claim 1, wherein said A-C supply is a three-phase supply.

6. A full-wave rectifying system for deriving a direct voltage from an A-C supply, said system comprising:
   (a) two like sets of diodes connected in parallel relation, said set being coupled to said A-C supply in an arrangement wherein the diodes in one set effect rectification in one current direction and those in the other set effect rectification in the reverse current direction,
   (b) a series of reactors equal in number to the number of diodes in each set, each reactor having a core, and four primary conductors wound thereon, the first and third conductors being wound in one direction and the second and fourth being wound in the reverse direction, (c) means connecting each diode in one set serially both with the second primary of the associated reactor and the fourth primary of the next reactor in the series, the fourth primary in the last reactor in the series being conneced to the second primary of the first reactor, (d) means connecting each diode in the other set serially both with the first primary of the associated reactor and the third primary of the next reactor in the series, the third primary in the last reactor in the series being connected to the first primary of the first reactor.

References Cited

UNITED STATES PATENTS

| | | | |
|---|---|---|---|
| 2,994,028 | 7/1961 | Dortort | 321—27 |
| 3,013,200 | 12/1961 | Dortort | 321—27 |
| 3,018,380 | 1/1962 | Bright et al. | 321—27 XR |
| 3,170,106 | 2/1965 | Rosenstein | 321—27 XR |
| 3,229,187 | 1/1966 | Jensen | 321—27 XR |
| 3,270,271 | 8/1966 | Stuefen | 321—27 XR |
| 3,334,289 | 8/1967 | Chumakov | 321—27 XR |
| 3,467,851 | 9/1969 | Dortort | 321—27 |

WILLIAM M. SHOOP, JR., Primary Examiner